United States Patent [19]

Primeau

[11] Patent Number: 4,471,996

[45] Date of Patent: Sep. 18, 1984

[54] WHEELBARROW WITH PIVOTED HANDLES

[76] Inventor: Mario Primeau, 8710 Marjolaine, Ville St. Leonard, Quebec, Canada, H1R 2H6

[21] Appl. No.: 417,860

[22] Filed: Sep. 14, 1982

[30] Foreign Application Priority Data

Oct. 2, 1981 [CA] Canada ................................... 387145

[51] Int. Cl.³ ............................................... B62B 1/20
[52] U.S. Cl. ..................................... 298/3; 280/47.31;
280/653
[58] Field of Search ............................... 298/2, 3, 5, 6;
280/47.3, 47.31, 653, 47.36, 47.37 R

[56] References Cited

U.S. PATENT DOCUMENTS

| | | | |
|---|---|---|---|
| 1,255,128 | 2/1918 | Bayley | 280/47.31 X |
| 2,797,125 | 6/1957 | Vogler | 280/47.31 X |
| 2,938,734 | 5/1960 | Guimond | 280/47.37 R X |
| 2,967,058 | 1/1961 | Hoffmann, Jr. | 280/47.31 X |
| 3,258,275 | 6/1966 | Schaeter et al. | 280/47.37 R X |
| 4,412,689 | 11/1983 | Lee | 280/47.37 R X |

FOREIGN PATENT DOCUMENTS 711297  6/1954  United Kingdom ............. 280/47.31

Primary Examiner—Robert J. Spar
Assistant Examiner—Janice Krizek
Attorney, Agent, or Firm—Alan Swabey; Robert Mitchell; Guy Houle

[57] ABSTRACT

A load-carrying device comprises a frame adapted to support a load to be carried, and having front and rear end portions. A wheel is rotatably mounted to the frame and positioned at the front end portion for supporting same. The device of the invention further comprises elongated handle means pivotally connected to the rear end portion and frame support means connected to and displaceable with the handle means, the handle means being pivotally movable between a first position whereat the handle means extends rearwardly of the frame for carrying the load with the frame support means being disposed to support the rear end portion, and a second position whereat the frame support means is retracted from its supporting position. A releasable locking means is also provided for interlocking the handle means with the frame in the first position. Pivotal movement of the handle means from the first to the second position causes the frame to be displaced from a raised position above ground to a lowered position adjacent the ground and the rear end portion of the frame to be disposed substantially on ground level, thereby enabling the load to be loaded or unloaded at ground level.

24 Claims, 14 Drawing Figures

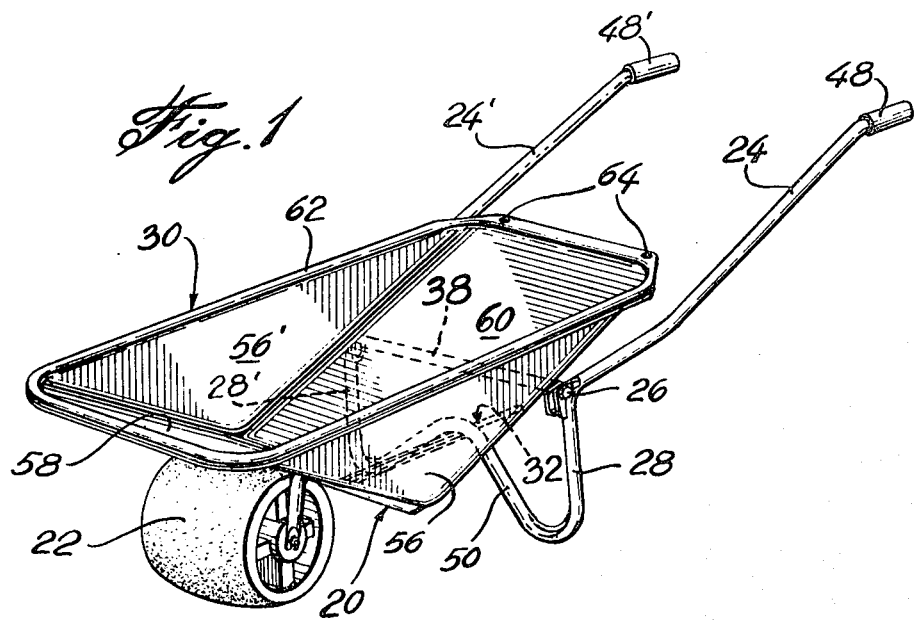
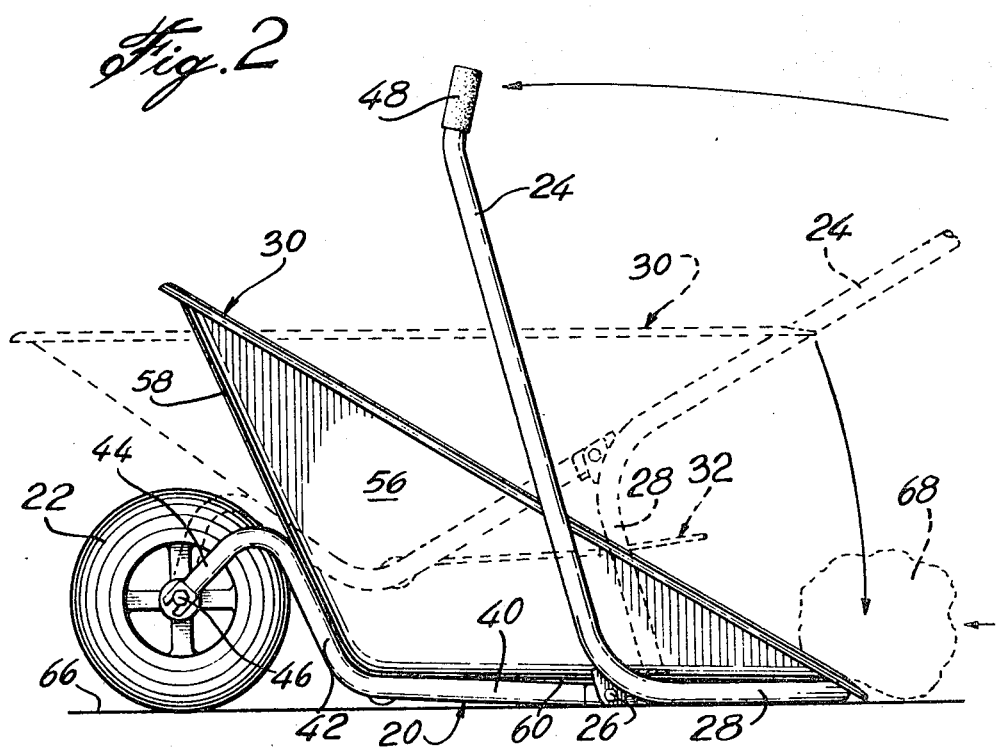

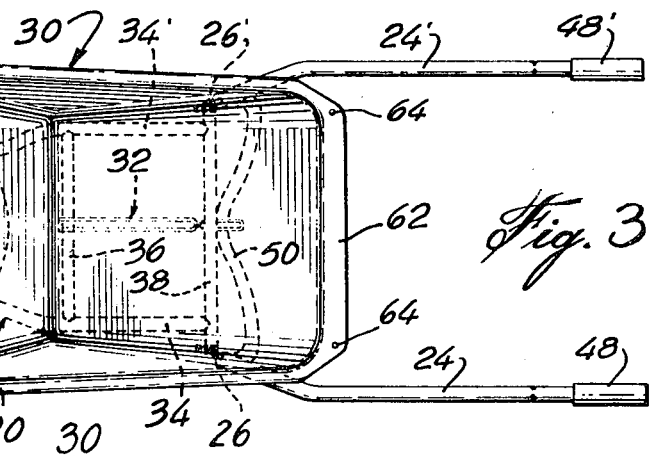
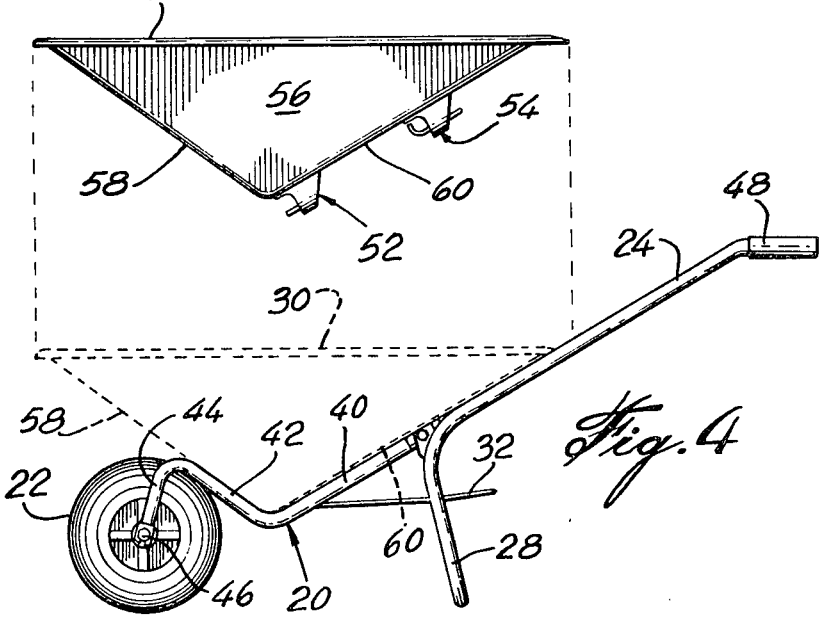
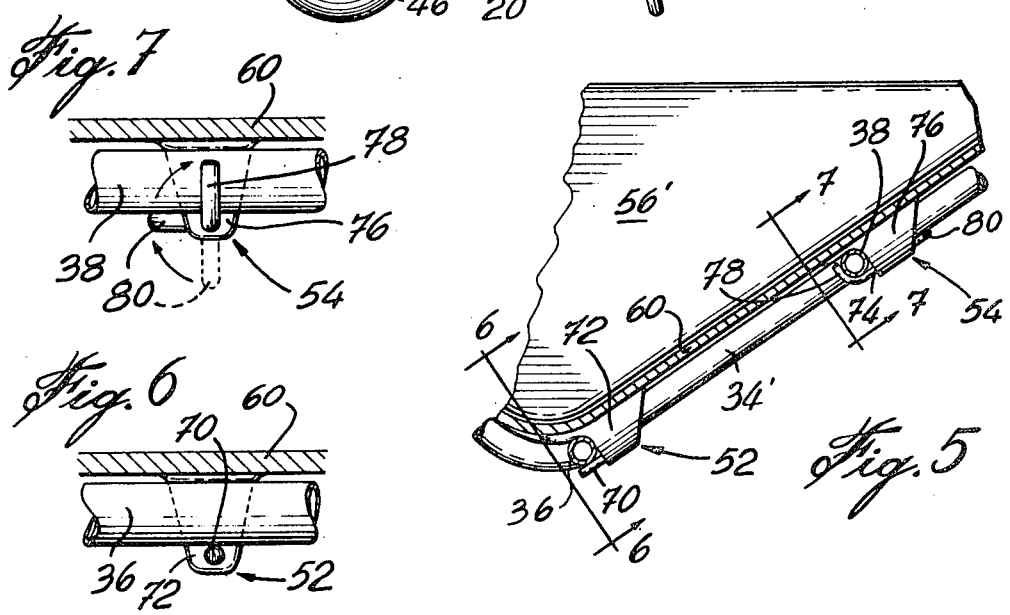
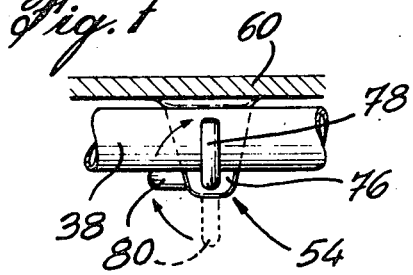
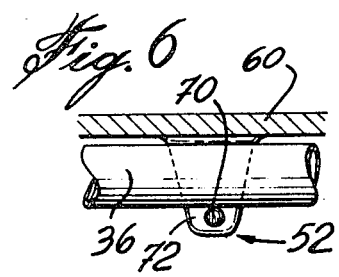

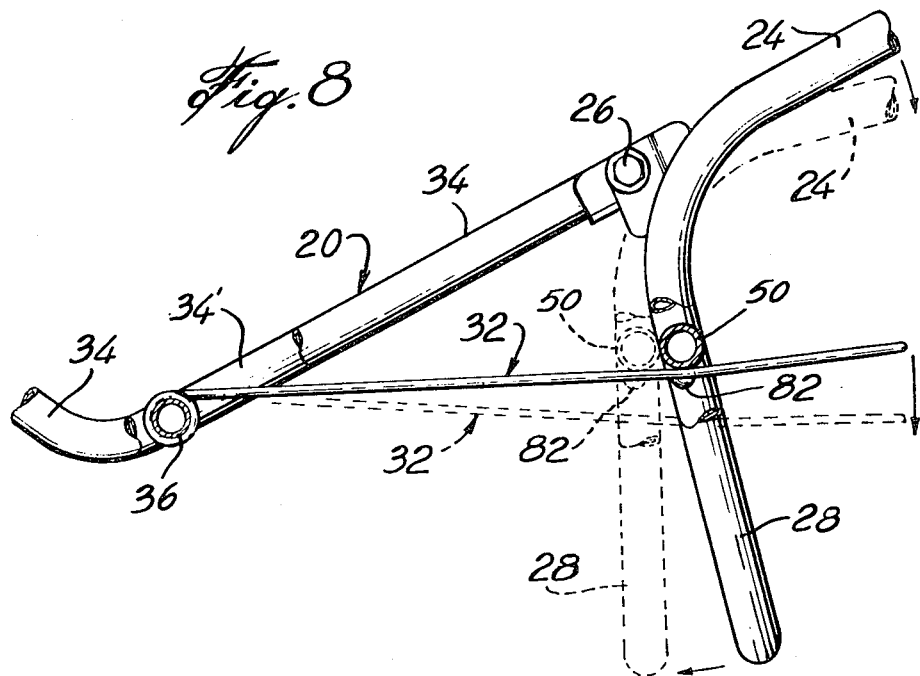
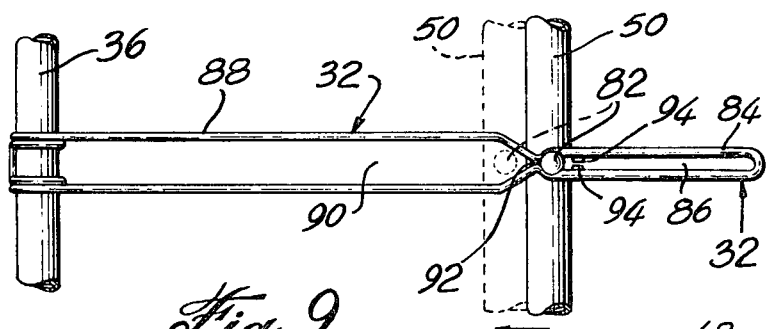
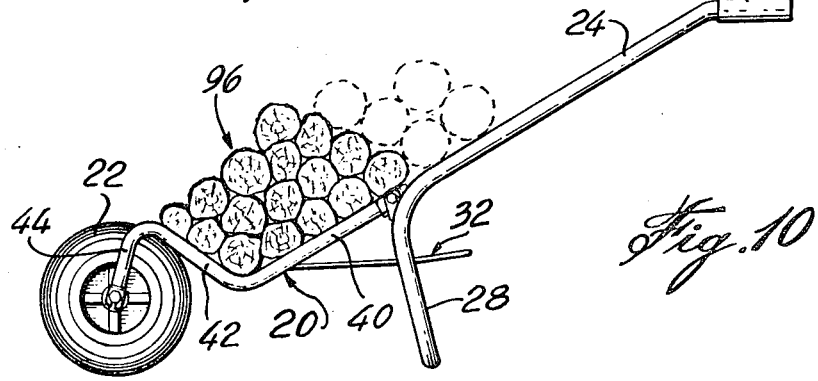

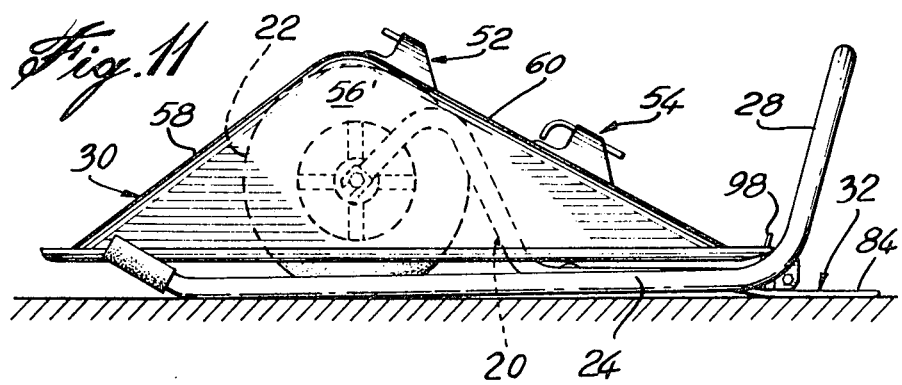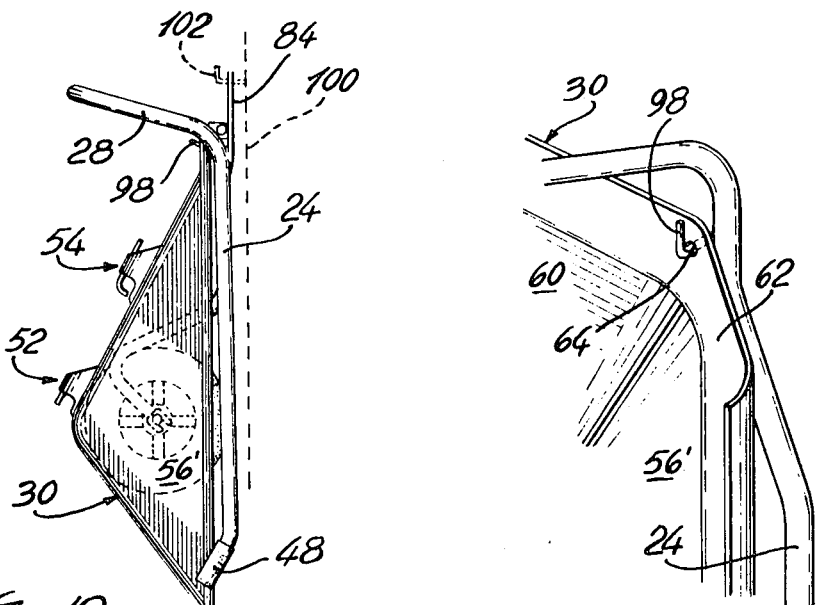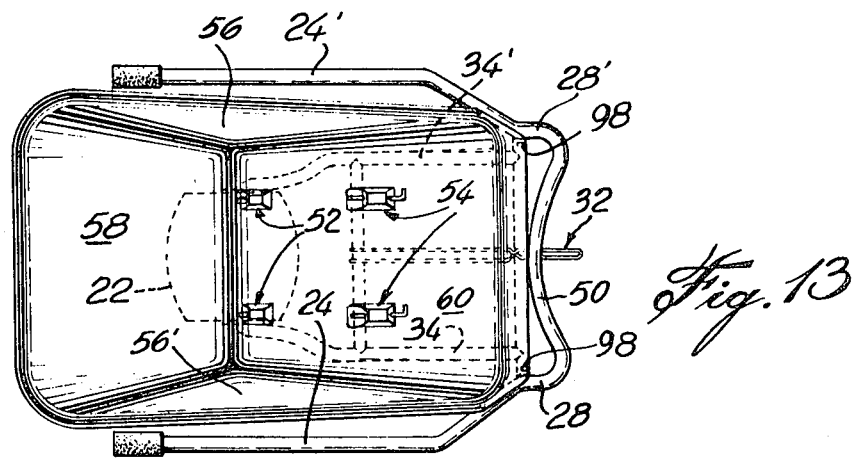

WHEELBARROW WITH PIVOTED HANDLES

BACKGROUND OF THE INVENTION

The present invention relates to improvements in load-carrying devices, especially wheelbarrows.

Wheelbarrows have always posed a storage problem particularly to those living in the city, where the available storage areas for such bulky implements are very confined, if practically non-existent.

Wheelbarrows of the knock-down type have been proposed, for instance, in U.S. Pat. No. 2,742,300. In such type of wheelbarrow, the wheel fork, handles and legs can be disassembled from the barrow frame and separated out for compacting. Although the use of tools is deliberately avoided and there are no bolts, nuts or other small left-overs to be bagged and stored, there still remains the possibility of the separated parts being misplaced or eventually lost during storage, particularly the handles and legs which are not generally speaking bulky items and as such can be readily overlooked.

Moreover, many persons have suffered severe back injuries as a result of loading a wheelbarrow with heavy objects, such as logs or rocks. In the loading process, one must of course lift the object to be loaded from the ground either directly with the hands or using a tool such as a shovel and bring such object to the height of the barrow receptacle in order to load same. If the object is too heavy for the user or is not well balanced in weight so that it can be easily lifted, or if the user is not positioned so as to correclty lift the object, back injuries will most likely occur.

SUMMARY OF THE INVENTION

It is an aim of the present invention to alleviate either problem mentioned above.

Accordingly, it is an object of this invention to provide a load-carrying device which either can be collapsed without necessitating disassembly thereof into separate parts, or can permit loading thereof at ground level or, preferably, which combines both such collapsibility and loadability features.

In accordance with a broad aspect of the invention, there is thus provided a load-carrying device comprising a frame adapted to support a load to be carried, the frame having front and rear end portions and a planar load-supporting section which includes the rear end portion. A wheel is rotatably mounted to the frame and positioned at the front end portion for supporting same. The device of the invention further comprises elongated handle means pivotally connected to the rear end portion and frame support means connected to and displaceable with the handle means, the handle means being pivotally movable between a first position whereat the handle means extends rearwardly of the frame for carrying the load with the frame support means being disposed to support the rear end portion, and a second position whereat the frame support means is retracted from its supporting position. A releasable locking means is also provided for interlocking the handle means with the frame in the first position.

According to a preferred embodiment which features ease of loading, the plane of the load-supporting frame section intersects the wheel below the rotation axis thereof so as to permit the load-supporting section to lie substantially at ground level and to thereby facilitate loading or unloading of the load, when the handle means is in the second position. In this embodiment, the handle means preferably constitutes an elongated lever arm cooperable with the frame support means to displace the load-supporting frame section between a raised position above ground and a lowered position adjacent the ground, when such lever arm is pivotally moved between the first and second positions. Preferably, the plane of the load-supporting frame section intersects the wheel at substantially the periphery thereof so as to enable the load-supporting section to lie substantially against the ground and to thereby permit the load to be loaded or unloaded substantially horizontally at ground level, in the second position.

A particularly preferred construction according to the invention also features collapsibility. In such embodiment, the handle means is pivotally movable to a third position beyond the second position, and comprises a pair of spaced apart elongated members each pivotally connected to the rear end portion of the frame and adapted to be folded over the frame when pivotally moved into the third position. These handle members in the third position extend forwardly of the frame and adjacent thereto with the support means projecting upwardly from the load-supporting frame section so as to provide a load-carrying device of reduced overall length for convenient storage.

The load-carrying device of the invention advantageously further includes a top-loading receptacle detachably mounted on the frame. This receptacle enables one to carry particulate material such as earth, gravel, leaves and the like.

BRIEF DESCRIPTION OF THE DRAWINGS

A preferred embodiment of the present invention will now be described with reference to an example thereof as illustrated in the accompanying drawings wherein:

FIG. 1 is a perspective view of a wheelbarrow according to the invention;

FIG. 2 is a side elevation view showing the wheelbarrow of FIG. 1 in its loading position at ground level;

FIG. 3 is a top view of the wheelbarrow represented in FIG. 1;

FIG. 4 is an exploded side elevation view showing how the barrow receptacle is detachably mounted on the load-supporting frame;

FIG. 5 is a fragmentary sectional view showing the securing means enabling the barrow receptacle to be removably secured to the load-supporting frame;

FIGS. 6 and 7 are sectional views taken along lines 6—6 and 7—7 of FIG. 5, respectively;

FIG. 8 is a fragmentary sectional view showing the releasable locking means enabling the handles of the wheelbarrow to be interlocked with the load-supporting frame in the load-carrying position;

FIG. 9 is a fragmentary bottom view further illustrating the releasable locking means represented in FIG. 8;

FIG. 10 is a side elevation view showing how the wheelbarrow can be used without its barrow receptacle to carry a load of wood logs;

FIG. 11 is a side elevation view showing the wheelbarrow in its collapsed position, for storage;

FIG. 12 is a view similar to that of FIG. 11, showing how the wheelbarrow in its collapsed position can be hung vertically, for storage;

FIG. 13 is a top view of the wheelbarrow represented in FIG. 11, showing in particular the handles folded over the load-supporting frame; and FIG. 14 is a fragmentary perspective view showing how the barrow receptacle can be attached to the folded handles, for storage.

DESCRIPTION OF PREFERRED EMBODIMENTS

Referring first to FIGS. 1-4, the wheelbarrow illustrated is seen to comprise a load-supporting frame 20, a wheel 22 rotatably mounted to the frame 20 at the front end thereof, a pair of elongated handle bars 24 and 24' pivotally connected to the frame 20 at the rear end thereof for vertical swinging movement about pivots 26 and 26', and a pair of supporting legs 28 and 28' connected respectively to the handle bars 24 and 24' and displaceable therewith. A top-loading receptacle 30 is detachably mounted on the frame 20. A releasable locking member 32 is provided for interlocking the handle bars with the frame in the load-carrying position represented in FIG. 1, whereat the handle bars 24 and 24' extend rearwardly of the frame 20 with the legs 28 and 28' being disposed vertically.

The load-supporting frame 20 comprises a pair of spaced-apart convergent side bars 34 and 34' carrying the wheel 22 at their convergent ends, and central and rear cross-bars 36 and 38 interconnecting the side bars 34 and 34'. Side bars 34 and 34' are each formed with a straight rearwardly extending portion 40 and a straight forwardly extending portion 42 angularly joined to the side bar portion 40, and a downwardly extending portion 44 angularly joined to the side bar portion 42 and connected at its free end to the wheel axle 46. The side bar portions 40 define together with the cross-bars 36 and 38 a planar load-supporting section of the frame, whereas the side bar portions 42 define a planar load-arresting frame section. The plane of the load-supporting frame section intersects the wheel 22 at substantially the periphery thereof and below the wheel axle 46, as best shown in FIG. 4. As is also apparent from FIGS. 1 and 4, the handle bars 24 and 24' in the load-carrying position extend in a plane common with the plane of the load-supporting frame section.

The handle bars 24 and 24' are pivotally connected to the respective ends of the rear cross-bar 38, the pivot axis defined by the pivots 26 and 26' being coaxial with the longitudinal axis of the cross-bar 38 The handle bars 24 and 24' are provided with respective handle grips 48 and 48'. The supporting legs 28 and 28' are respectively fixed to the handle bars 24 and 24' at their respective pivotal connections to the cross-bar 38. An inverted U-shaped brace member 50 interconnects the legs 28 and 28' which form therewith W-shaped legs. The handle bars 24 and 24', supporting legs 28 wnd 28' and brace member 50 are integral, as best shown in FIG. 1.

The top-loading receptacle 30 which is detachably mounted on the frame 20 by means of the attachment members 52 and 54 includes a pair of opposed side walls 56 and 56' and substantially planar front and rear walls 58 and 60 intersecting one another at the bottom of the receptacle. The front and rear walls 58 and 60 are inclined relative to one another at the same angle of inclination defined between the side bar portions 40 and 42 so as to abut thereagainst, as shown in broken lines in FIG. 4. The receptacle 30 is provided at its peripheral edge with a flange 62 having a pair of holes 64 formed in the flange rear portion, the purpose of which will be hereinafter explained.

As shown in FIG. 2, forward pivotal movement of the handle bars 24 and 24' from the position represented in broken lines to the position represented in solid lines causes the legs 28 and 28' to be retracted from their supporting position and the rear end of the wheelbarrow to be thus lowered and disposed substantially on ground level. In this latter position, the load-supporting frame section defined by the side bar portions 40 and cross-bars 36,38 lies substantially against the ground 66 (due to the angular inclination of the side bar portions 40 relative to the side bar portions 42) with the rear wall 60 of the barrow receptacle 30 disposed substantially horizontally, thereby enabling a load such as a rock 68 to be loaded (or unloaded) substantially horizontally at ground level. The legs 28 and 28' extend rearwardly of the frame 20 and lie in a plane common with the plane of the load-supporting frame section so as to permit the rearmost portion of the rear wall 60 to extend thereover adjacent the ground. The handle bars 24 and 24' thus constitute lever arms cooperable with the legs 28 and 28' to displace the frame 20 with the barrow receptacle 30 between a raised position above ground (corresponding to the load-carrying position) and a lowered position adjacent the ground (corresponding to a loading or unloading position). As shown, the handle bars 24 and 24' have a length of about 1.5 times the length of the frame 20 and therefore define lever arms of sufficient leverage to pry the frame with the receptacle when loaded with a relatively heavy load.

With such an arrangement, the loading procedure can be compared to the sweeping of particulate matter into a dust-pan; for example, loose leaves can be swept or racked directly into the barrow receptacle at ground level. As also shown in FIG. 2, the rock 68 can simply be rolled over the receptacle rear well 60 lying horizontally against the ground and into the receptacle 30, and therefore there is no longer any need of lifting such heavy object by hand for loading as in conventional wheelbarrows.

Referring next to FIGS. 5-7, a set of attachment members 52 and 54 is provided for removably securing the receptacle 30 to the frame 20, the former being adapted to abut against the cross-bar 36 of the frame and the latter to lockingly engage with the cross-bar 38. The attachment member 52 comprises an abutment pin 70 fixed to a pin holding element 72 which is secured to the outer surface of the receptacle rear wall 60. The pin 70 and pin holding element 72 define a fork-like member for receiving the cross-bar 36 transversely thereto and in tight fit engagement, as shown in FIGS. 5 and 6. The attachment member 54 comprises an elongated locking pin 74 mounted for axial rotation on its longitudinal axis in the pin holding element 76 also secured to the outer surface of the receptacle rear wall 60. The locking pin 74 has an end portion 78 extending perpendicularly to its longitudinal axis and adapted to lockingly engage with the cross-bar 38 held transversely thereto, as shown in FIGS. 5 and 7. The other end portion 80 of the pin 74 extends perpendicularly with respect to the pin longitudinal axis and also to the locking portion 78, and defines a handle. As shown in FIG. 7, movement of the handle portion 80 from the position represented in broken lines to the position represented in solid lines causes the pin to axially rotate on its longitudinal axis and the locking portion 80 thereof to move into the locking position and to thereby securely retain the cross-bar 38. Two sets of attachment members 52 and 54 are provided on the outer surface of the receptacle rear wall 60, as best shown in FIG. 13.

Turning to FIGS. 8 and 9, the locking member 32 for releasably interlocking the handle bars 24 and 24' to the frame 20 in the load-carrying position takes the form of an elongated spring wire having one end connected to the cross-bar 36 and the other end adapted to releasably engage a downwardly projecting retaining pin 82 having an elongated head and fixed to the inverted U-shaped brace member 50 at the apex thereof. The end of the wire member 32 connected to the cross-bar 36 is wound thereabout so as to urge the member 32 upwardly. As shown in FIG. 9, the wire member 32 is bent to define a narrow looped end section 84 having a narrow slot 86 and a wide main section 88 having an enlarged slot 90; the slot 90 is adapted to freely receive the pin head and the slot 86 to lockingly engage therewith. The wire member 32 is also inwardly bent on either sides thereof, at the interconnection of the sections 84 and 88, to define a resiliently biased restricted troath channel 92 interconnecting the slots 86 and 90. A pair of opposed stop members 94 are provided inwardly of the looped section 84 so as to confine the pin 82 adjacent the troath channel 92 and thereby prevent the pin from running along the entire length of the slot 84 and thus being loosely engaged therein.

In order to disengage the wire member 32, the handle bars 24 and 24' are pivotally moved downwardly from the load-carrying position represented in solid lines in FIG. 8 so as to forwardly displace the legs 28 and 28' and the brace member 50 carried thereby and thus force the stem of the pin 82 fixed to the brace member 50 to pass through the troath channel 92 and into the slot 90, as represented in broken lines in both FIGS. 8 and 9. Once the pin 82 is in the enlarged slot 90, the wire member 32 is then moved downwardly by conveniently applying one's foot on the end section 84 and depressing the latter against the upward force exerted by the winding of the wire member 32 around the cross-bar 36, so that the member 32 clears the pin 82 as shown in broken lines in FIG. 8. The handle bars 24 and 24' with the legs 28 and 28' are thus free to pivot vertically and can then be upwardly displaced so as to occupy the loading (or unloading) position represented in FIG. 2. Since the wire member 32 is upwardly biased, it automatically moves to abut against the cross-bar 38 when it is released by the foot, so that it does not loosely hang from the cross-bar 36.

The looped end portion 84 of the wire member 32 is extended rearwardly of the frame 20 so as to permit the head of the pin 82 to slidably run along the section 84 while depressing it when the handle bars 24 and 24' and legs 28 and 28' are returned to the load-carrying position. Locking is achieved by moving the handle bars beyond the load-carrying position so that the pin 82 penetrates into the enlarged slot 90 with the wire member 32 snapping against the brace member 50; a slight upward movement of the handle bars then forces the pin to pass through a troath channel 92 and into the narrow slot 86 to be locked in the confined area defined between the troath channel 92 and the stop members 94.

FIG. 10 shows how the wheelbarrow can be used without its barrow receptacle, like a dolly, to carry for example a load of wood logs 96. The load-arresting section of the frame defined by the side bar portions 42 enables the load to be maintained on the frame during transportation thereof. Since, as already mentioned, the handle bars 24 and 24' in the load-carrying position extend in a plane common with the plane of the load-supporting frame section defined by the side bar portions 40 and cross-bars 36,38, additional logs can be piled onto the handle bars 24 and 24' as represented in broken lines, thereby enabling the wheelbarrow to carry a greater load. Moreover, with this dolly-like structure, one can easily carry boxes of relatively large dimensions as well as small pieces of furniture such as desks, tables and the like. By placing a sheet of plywood onto the load-supporting and load-arresting sections of the frame, it is also possible to carry a load of construction materials such as bricks.

Referring finally to FIGS. 11-14, by further pivotally moving the handle bars 24 and 24' beyond the loading (or unloading position) represented in FIG. 2, in a direction towards the wheel 22, the handle bars can be folded over the frame 20 so as to extend forwardly of the frame and adjacent thereto with the legs 28 and 28' extending upwardly, thereby providing a collapsed structure of reduced overall length for convenient storage, as best shown in FIGS. 11 and 13. Prior to folding the handle bars 24 and 24' over the frame 20 the barrow receptacle 30 is of course detached from the frame so as to enable the legs 28 and 28' to be moved upwardly. Once the handle bars have been folded over the frame, the receptacle can be conveniently inverted and positioned upsidedown over the wheel 22 and frame 20, the receptacle 30 having a depth such as to permit the wheel 22 to be received therewithin with the periphery of the wheel abutting the front and rear walls 58 and 60, as shown in FIG. 11. A pair of hooks 98 are provided for attaching the rear end of the inverted receptacle. Each hook 98 is disposed on the inner side of a respective handle bar adjacent its pivotal connection to the frame and is adapted to extend through a respective hole 64 provided in the rear portion of the flange 62 of the receptacle, as best shown in FIG. 14.

The collapsed wheelbarrow shown in FIGS. 11 and 13 occupies a space of about 6 cubic feet as compared to about 15-18 cubic feet in the case of a conventional wheelbarrow, and can thus be conveniently placed in a car trunk. Moreover, the wheelbarrow in its collapsed position can be stored vertically by being suspended from a wall 100, as shown in FIG. 12; to this end, the rearwardly extending looped end section 84 of the wire member 32 attached to the frame 20 can be conveniently hung over a hook 102 secured to the wall 100.

The load-supporting frame 20 as well as the handle bars 24,24', legs 28,28' and brace member 50 which are integral can be made of conventional steel tubing having a 1 inch diameter. The barrow receptacle 30, on the other hand, is advantageously made of light weight and impact resistant plastic material such as polyethylene, which is also corrosion-free and does not require any maintainance such as painting; this plastic material can be formed into a receptacle of the desired shape by vacuum molding or by structural foam injection molding. As it is apparent from the drawings, the wheelbarrow has a center of gravity which is located rearwardly of the wheel 22 and is much lower than in conventional wheelbarrows; thus, better handling of a load is achieved during transportation since the wheelbarrow has a lesser tendency to tilt. Also, by using a wheel 22 which has an elongated spherical configuration (as best shown in FIG. 1) and provides a large surface of contact with the ground, one can more easily work in soft terrain and without damaging the lawn; the elongated configuration of the front wheel also contributes to a better handling of the load during transportation whereas its rounded sides permits the wheelbarrow to be better controlled during side-tipping for discharging the load. The wheel proposed in Canadian Pat. No. 1,058,658 can be advantageously used to this end.

I claim:

1. A load-carrying device comprising:
   a frame adapted to support a load to be carried, said frame having front and rear end portions and a planar load-supporting section which includes said rear end portion;
   a wheel rotatably mounted to said frame and positioned at said front end portion for supporting said front end portion;
   elongated handle means pivotally connected to said rear end portion and frame support means connected to and displaceable with said handle means, said handle means being pivotally movable between a first position whereat said handle means extends rearwardly of said frame for carrying said load with said frame support means being disposed to support said rear end portion, and a second position whereat said frame support means is retracted from its supporting position; and
   releasable locking means for interlocking said handle means with said frame in said first position; the plane of said load-supporting frame section intersecting said wheel below the rotation axis thereof so as to permit said load-supporting section to lie substantially at ground level and to thereby facilitate loading or unloading of said load, when said handle means is in said second position.

2. A load-carrying device as claimed in claim 1, wherein the plane of said load-supporting frame section intersects said wheel at substantially the periphery thereof so as to enable said load-supporting section to lie substantially against the ground and to thereby permit said load to be loaded or unloaded substantially horizontally at ground level, in said second position.

3. A load-carrying device as claimed in claim 1, wherein said handle means constitutes an elongated lever arm cooperable with said frame support means to displace said load-supporting frame section between a raised position above ground and a lowered position adjacent the ground, when said lever arm is pivotally moved between said first and second positions.

4. A load-carrying device as claimed in claim 1, wherein said handle means comprises a pair of spaced-apart elongated members each pivotally connected to said rear end portion of said frame and adapted to be pivoted forwardly when moved into second position, said members in said second position projecting upwardly from said load-supporting frame section with said support means being disposed rearwardly thereof.

5. A load-carrying device as claimed in claim 1, wherein said handle means is pivotally movable to a third position beyond said second position and comprises a pair of spaced-apart elongated members each pivotally connected to said rear end portion of said frame and adapted to be folded over said frame when pivotally moved into said third position, said members in said third position extending forwardly of said frame and adjacent thereto with said support means projecting upwardly from said load-supporting frame section so as to provide a load-carrying device of reduced overall length for convenient storage.

6. A load-carrying device as claimed in claim 5, wherein the plane of said load-supporting frame section intersects said wheel at substantially the periphery thereof so as to enable said load-supporting section to lie substantially against the ground and to thereby permit said load to be loaded or unloaded substantially horizontally at ground level, in said second position.

7. A load-carrying device as claimed in claims 5 or 6, wherein said elongated members constitute lever arms cooperable with said frame support means to displace said load-supporting frame section between a raised position above ground and a lowered position adjacent the ground, when said lever arms are pivotally moved between said first and second positions.

8. A load-carrying device as claimed in claim 6, wherein said elongated members constitute lever arms cooperable with said frame support means to displace said load-supporting frame section between a raised position above ground and a lowered position adjacent the ground when said lever arms are pivotally moved between said first and second positions, said lever arms having sufficient leverage to pry said load-supporting frame section when loaded with a relatively heavy load.

9. A load-carrying device as claimed in claim 3, wherein said front end portion of said frame has a substantially planar load-arresting frame section which is contiguous to said load-supporting frame section, the respective planes of said frame sections being inclined relative to one another.

10. A load-carrying device as claimed in claim 5, wherein said handle members in said first position extend in a plane common with the plane of said load-supporting frame section.

11. A load-carrying device as claimed in claim 5, wherein said support means comprise a pair of supporting legs each connected to a respective handle member at the pivotal connection of said respective member to said frame.

12. A load-carrying device as claimed in claim 11, wherein said supporting legs in said second position lie in a plane substantially common with the plane of said load-supporting frame section.

13. A load-carrying device as claimed in claim 11, wherein a brace member interconnects said supporting legs.

14. A load-carrying device as claimed in claim 13, wherein said handle members, supporting legs and brace member are integral.

15. A load-carrying device as claimed in claim 13, wherein said releasable locking means comprises an elongated locking member having one end connected to said frame and the other end adapted to releasably engage a retaining pin on said brace member.

16. A load-carrying device as claimed in claim 15, wherein said locking member is provided at said other end with two apertures and a resiliently biased restricted troath channel interconnecting said apertures, one of said apertures being adapted to freely receive said retaining pin and the other to lockingly engage therewith, whereby forced pivotal movement of said handle members in a direction from said second position towards said first position and beyond said first position causes said pin to pass from said other aperture to said one aperture through said channel and to thereby release said locking member.

17. A load-carrying device as claimed in claim 16, wherein said brace member is an inverted V-shaped member and said supporting legs form with said brace member W-shaped legs, said retaining pin being fixed at the apex of said inverted V-shaped member, and wherein said locking member is normally biased towards said rear end portion of said frame and is provided at said other end thereof with an extension adapted to slidably engage said retaining pin when said handle members are pivotally moved between said first and second positions.

18. A load-carrying device as claimed in claim 15, wherein said locking member is provided at said other end thereof with an extension having means for vertically suspending said load-carrying device from a wall, when said handle members are folded over said frame in said third position for storage.

19. A load-carrying device as claimed in claims 1 or 5, including a top-loading receptacle detachably mounted on said frame.

20. A load-carrying device as claimed in claim 9, including a top-loading receptacle detachably mounted on said frame, said receptacle having a bottom and substantially planar front and rear walls intersecting one another at said bottom and inclined relative to one another at the same angle of inclination defined between said load-arresting and load-supporting frame sections so as to permit said front and rear walls to abut against said load-arresting and load-supporting frame sections, respectively.

21. A load-carrying device as claimed in claim 20, including further releasable locking means for removably securing said receptacle on said frame.

22. A load-carrying device as claimed in claim 20, wherein said receptacle has a depth such as to permit said wheel to be received therewithin with the periphery of said wheel abutting the bottom of said receptacle, when said receptacle is inverted and positioned over said wheel and frame with said handle members folded over said frame in said third position, for storage.

23. A load-carrying device as claimed in claim 22, including means for removably attaching said inverted receptacle to said folded handle members.

24. A load-carrying device as claimed in claims 1, 5 or 20, wherein said wheel has an elongated spherical configuration.

* * * * *